United States Patent [19]
Pardi

[11] Patent Number: 5,247,739
[45] Date of Patent: Sep. 28, 1993

[54] METHOD OF MAKING A HEAT EXCHANGER USING AN ADJUSTABLE BRAZING FIXTURE

[75] Inventor: Ronald L. Pardi, Tierra Verde, Fla.

[73] Assignee: Ford Motor Company, Dearborn, Mich.

[21] Appl. No.: 963,183

[22] Filed: Oct. 19, 1992

Related U.S. Application Data

[62] Division of Ser. No. 632,821, Dec. 24, 1990, Pat. No. 5,165,163.

[51] Int. Cl.$^5$ .............................................. B23P 19/04
[52] U.S. Cl. .............................. 29/890.052; 29/890.03
[58] Field of Search ................ 29/726, 281.6, 281.5, 29/890.03, 890.046, 890.052, 890.045; 228/44.3, 183, 47; 269/254 R, 236, 258

[56] References Cited

U.S. PATENT DOCUMENTS

| | | | |
|---|---|---|---|
| 2,812,006 | 11/1957 | Berliant | 269/236 X |
| 3,176,973 | 4/1965 | Daniels | 269/254 R X |
| 3,941,293 | 3/1976 | Chartet | 228/44.3 |
| 3,953,016 | 4/1976 | Gersbacher | 269/236 |
| 3,995,805 | 12/1976 | Gersbacher | 228/44.3 |
| 4,128,235 | 12/1978 | Gersbacher | 29/726 X |
| 4,155,157 | 5/1979 | Gersbacher | 29/726 |
| 4,637,132 | 1/1987 | Iwase et al. | 29/890.046 X |
| 4,700,469 | 10/1987 | Kroetsch et al. | 29/726 |
| 4,743,003 | 5/1988 | Dietlein | 269/258 X |
| 4,769,888 | 9/1988 | Desiro | 269/258 X |
| 5,146,816 | 9/1992 | Badstieber | 269/236 X |

FOREIGN PATENT DOCUMENTS 969494  11/1982  U.S.S.R. ............................... 228/47

Primary Examiner—Mark Rosenbaum
Assistant Examiner—Peter Dungba Vo
Attorney, Agent, or Firm—Raymond L. Coppiellie; Roger L. May

[57] ABSTRACT

A brazing fixture apparatus for holding an article to be brazed comprises a frame and a mechanism connected to the frame for holding the article so that the weight of the article causes a force to be transmitted through the mechanism and applied to another portion of the article. The mechanism includes at least one lever pivotally mounted to the frame. The lever includes a graphite member attached to the lever for receiving the article thereon. The frame also includes a spacer bar which is positionable in a pair of spacer bar receiving members attached the frame for adjusting the size of the opening to accommodate different size articles. A method of making the heat exchanger using the fixture is also disclosed.

3 Claims, 3 Drawing Sheets

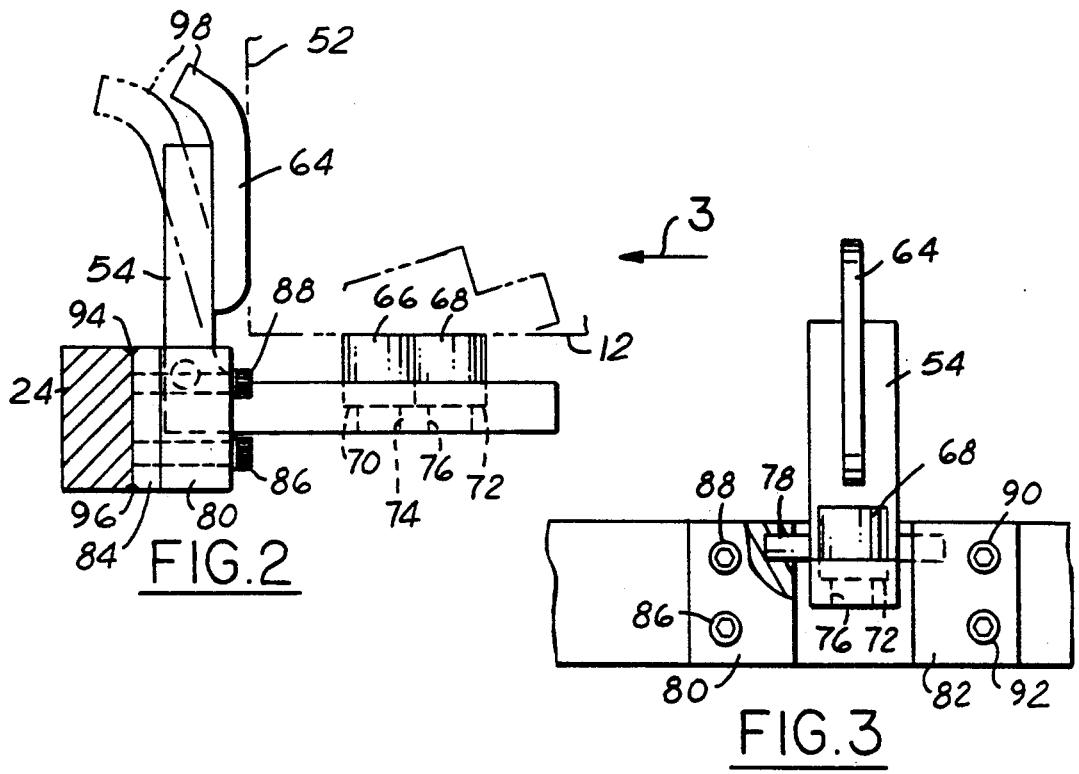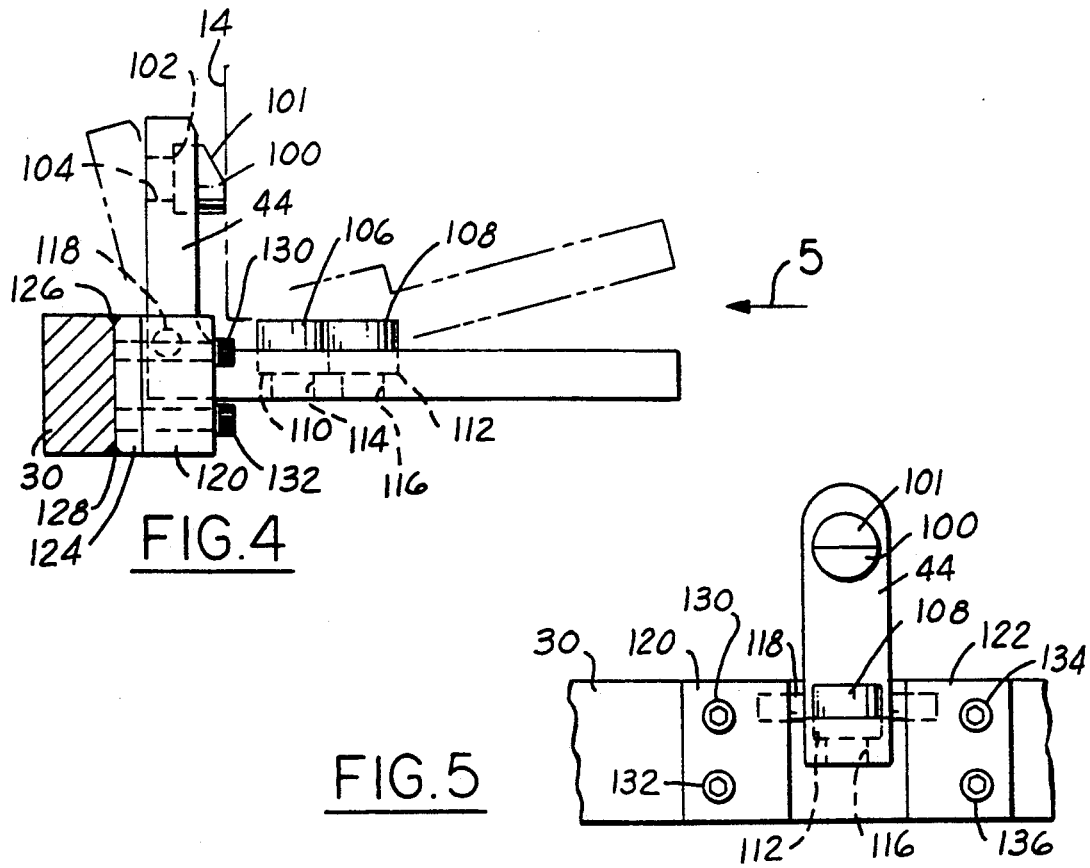

METHOD OF MAKING A HEAT EXCHANGER USING AN ADJUSTABLE BRAZING FIXTURE

This application is a divisional application of allowed U.S. Ser. No. 07/632,821, filed Dec. 24, 1990, now U.S. Pat. No. 5,165,163.

BACKGROUND OF THE INVENTION

1. Field of the Invention

The present invention relates to a brazing fixture for receiving an article to be brazed. The brazing fixture is especially adapted to receive a heat exchanger therein.

2. Discussion of the Related Art

Heater cores and certain other heat exchangers are manufactured by assembling tubes with fins thereon. A header plate is then attached to each end of the tubes and a tank is placed adjacent to each header plate. This assembly is then inserted into a furnace and the assembly is heated until it brazes together.

It was found that this procedure was not effective in obtaining proper brazing of all the components in the assembly. Specifically, the last outer fins on each side of the core and the side supports were not being properly brazed to the core and also the tanks were not being properly brazed to the header plates. To solve this problem, a steel band was placed around the core, including the side supports and a steel wire was placed around the core, including around the tanks. The configuration of the inlet and outlet tubes on the tanks usually prevented the use of a steel band around the tanks and thus a wire was used. The steel band was attached by a banding machine and required a separate work station prior to the brazing procedure. Likewise, the steel wire was hand fed around each core and it was twisted tight by a spinner machine. This required another work station prior to the brazing procedure.

Following the brazing procedure, the bands and wires were cut off of each heater core and discarded. This resulted in a large amount of waste bands and wires.

Therefore, it can be seen that the above procedure included extra machines in the manufacturing procedure with additional time and expense associated with operating these machines and with removing the bands and wires after brazing.

Another problem that occurred was that even though the brazing procedure had been improved by the force exerted by the bands and wires, as the heater core heated up in the furnace, the bands and wires also heated up. As the bands and wires heated up, they expanded and they failed to maintain a constant pressure on the heater core. Thus some of the advantage of using the bands and wires was also lost.

Gersbacher (U.S. Pat. No. 3,995,805) discloses a brazing fixture for plate type heat exchangers which exerts a holding pressure that is evenly distributed and uniformly applied. A hand operated lever generates pressure which is transferred by a plurality of pressure applying members. This device does not disclose using the weight of the heat exchanger to apply force to another portion of the heat exchanger for firmly holding the assembly together.

Gersbacher (U.S. Pat. No. 4,128,235) discloses a brazing fixture for plate type heat exchangers wherein multiple plates, fin elements and appropriate spacers are stacked upon one another and are held so that the parts maintain an assembled relation during brazing. This device does not disclose using the weight of the heat exchanger to apply force to another portion of the heat exchanger for firmly holding the assembly together.

Gersbacher (U.S. Pat. No. 4,155,157) discloses a brazing fixture for plate type heat exchangers wherein the fixture includes part locators. The part locators position the parts during assembly or loading and remain attached during brazing. The locators are influenced to maintain an engagement with assembled parts but are able to yield in controlled directions under expansion resulting from the heat of brazing. This device does not disclose using the weight of the heat exchanger to apply force to another portion of the heat exchanger for firmly holding the assembly together.

SUMMARY OF THE INVENTION

It is an object of the present invention to provide a brazing fixture which will eliminate the need for placing a band and/or a wire around the heat exchanger prior to brazing.

It is a further object of the present invention to provide a brazing fixture which applies a force to the sides of a heat exchanger thereby holding it firmly together for the brazing process.

It is still a further object of the present invention to provide a brazing fixture which uses the weight of the article to be brazed for applying forces to hold it together during the brazing process.

It is still a further object of the present invention to provide a brazing fixture which is adjustable in the size of the opening for accommodating articles of different sizes.

It is still a further object of the present invention to provide a method of making a heat exchanger which eliminates the need for placing a band and/or a wire around the heat exchanger prior to brazing.

The above objects are accomplished by a method for making a heat exchanger which comprises assembling a plurality of tube and fins together into a subassembly and placing a header plate and a tank on two ends of the subassembly to form a core. Then the method includes positioning the core into a fixture provided with means for holding the core so that the weight of the core causes a force to be applied to the tanks thereby firmly holding the core together, and heating the core to a temperature sufficient to cause the core to braze together.

BRIEF DESCRIPTION OF THE DRAWINGS

FIG. 2 illustrates a side view of a pivotable side support lever taken along line 2—2 in FIG. 1 according to the present invention.

FIG. 3 illustrates a view of the side support lever taken along arrow 3 in FIG. 2 according to the present invention.

FIG. 4 illustrates a side view of a pivotable end tank support lever taken along line 4—4 in FIG. 1 according to the present invention.

FIG. 5 illustrates a view of the end tank support lever taken along arrow 5 in FIG. 4 according to the present invention.

DETAILED DESCRIPTION OF THE PREFERRED EMBODIMENTS

Figure 1:
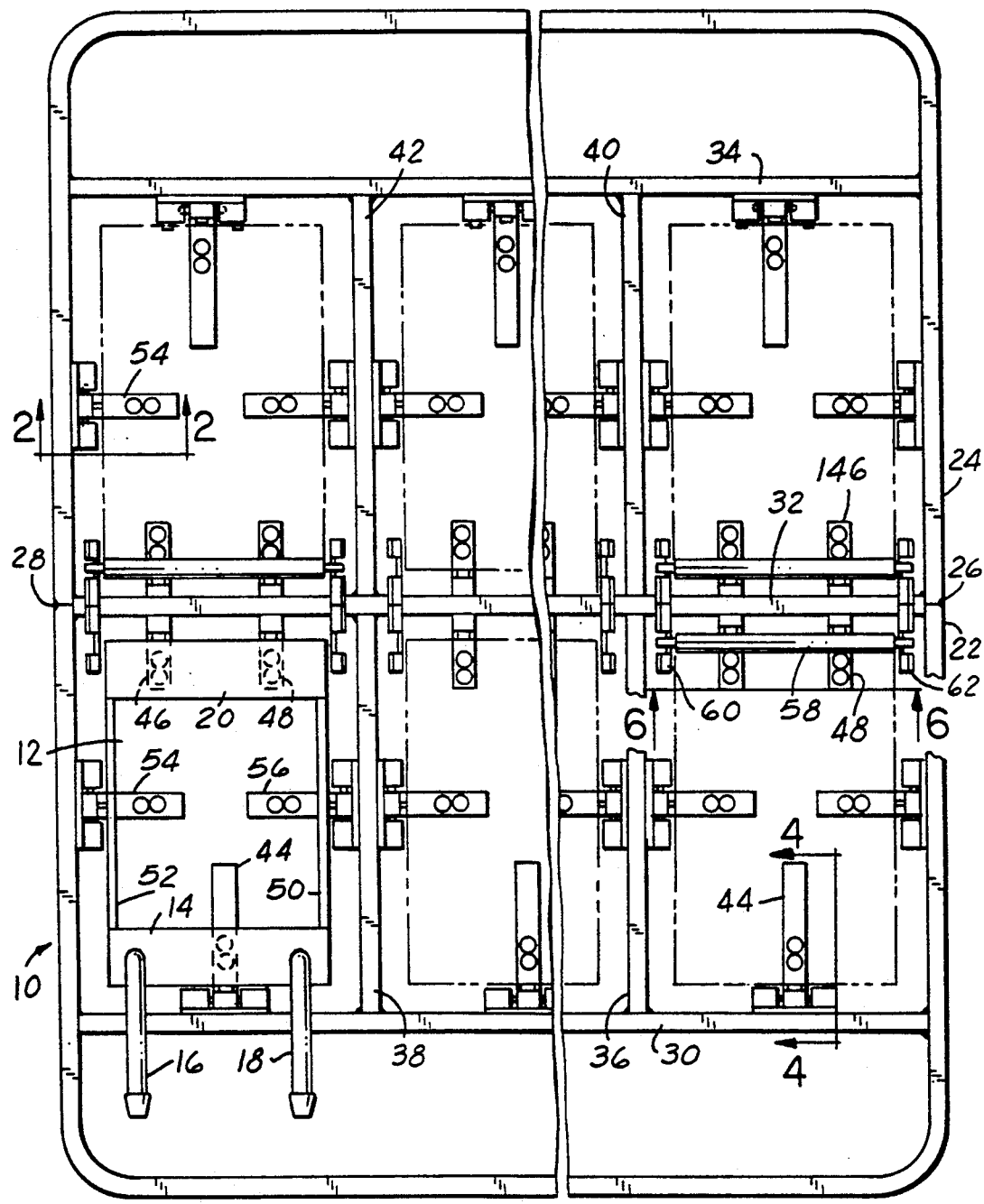
FIG. 1 illustrates a top view of the brazing fixture sized for holding a plurality of heat exchangers according to a preferred embodiment of the present invention.

FIG. 1 illustrates a brazing fixture apparatus 10 according to a preferred embodiment of the present invention. The brazing fixture apparatus 10 is designed to accommodate a plurality of heat exchangers, one of which is shown by reference numeral 12. The remaining heat exchangers are shown only in phantom lines for ease in understanding. The heat exchanger 12 is preferably a heater core made of tubes and fins including a header tank 14 which includes an inlet supply line 16 and an outlet supply line 18 attached thereto. The flow through the heat exchanger is typically through inlet supply line 16 down through one-half of the tubes of the core into header tank 20 and then back down the remaining half of the tubes of the core to header tank 14 and out outlet supply line 18.

The brazing fixture 10 is made up of an outer frame comprising two outer frame members 22 and 24 which are welded together at location 26 and 28. The outer frame members 22 and 24 are made from rectangular mild steel tubing. It is also possible to make the frame from high grade stainless steel such as 304 stainless steel. The material used was selected based on weight and strength considerations. Welded to the outer frame members 22 and 24 are stringers 30, 32 and 34. Connected between stringers 30, 32 and 34 are additional stringers 36, 38, 40 and 42. The stringers and the outer frame members define a plurality of openings which include the heat exchanger holding means and the adjustment means for adjusting the size of the opening for accommodating different size heat exchangers.

The holding means will now be described in connection with the frame defined by outer member 22 and stringers 30, 32 and 38. It is to be understood that the remaining frames include other holding means similar to that which will be described, however, these other holding means have not be assigned reference numerals for simplicity.

The heat exchanger 12 is held in the frame by a plurality of levers. The header tank 14 is positioned in the frame such that it is held by pivotable end tank support lever 44. The header tank 20 is positioned so that it is held in place by non-pivoting support levers 46 and 48. The heat exchanger 12 also includes side supports 50 and 52 which are positioned to be pushed together by pivotable side support levers 54 and 56. The levers 44, 46, 48, 54 and 56 will be described in further detail in connection with FIGS. 2-8.

The brazing fixture 10 also includes a means for adjusting the size of the opening defined by each of the frames shown in FIG. 1. The adjustment means includes a graphite spacer bar 58 disposed in a pair of spacer bar receiving members 60 and 62. The adjustment means will be described in further detail in connection with FIGS. 6-8.

The brazed fixture is designed such that the outer frame members 22 and 24 extend past the stringers 30 and 34 so that the inlet and outlet supply lines of the respective heat exchangers are not damaged when one heat exchanger runs into another fixture following the heat treatment done in the brazing furnace. This extra space defined between the outer frame members 22 and 24 and the stringers 30 and 34 provides protection for the inlet and outlet supply lines.

FIG. 2 and 3 disclose the details of the pivoting side support levers 54 and 56. Only lever 54 will be described for simplicity, it being understood that lever 56 is identical. The first position of the side support lever 54 shown in phantom illustrates the position of the side support lever 54 for accepting a heat exchanger into the fixture. The second position shown by the solid line in FIG. 2 illustrates the final position of the side support lever 54 when the heat exchanger is placed thereon. The lever 54 includes a stainless steel guide bar 64 for contacting the side supports 50 or 52 of the heat exchanger. The side support lever 54 also includes graphite members 66 and 68 which are press fit into recess 70 and 72 in the lever 54. The graphite members are adapted to receive the heat exchanger core thereon and are used to prevent the core of the heat exchanger from sticking to the lever 54 if any excess braze material flows from the heat exchanger. The lever 54 is also provided with knockout holes 74 and 76 for allowing the graphite members 66 and 68 to be removed if desired for replacement or cleaning.

The lever 54 is pivotally mounted on pivot pin 78. The pivot pin 78 is disposed in hanger plates 80 and 82. The hanger plates 82 are attached to tapping plates 84 (only one is shown) by socket head cap screws 86, 88, 90 and 92. The tapping plate 84 is attached to the outer frame member by welds illustrated by reference numerals 94 and 96. The tip of the stainless steel guide bar 64 is bent outwardly as shown at 98 for guiding the placement of the heat exchanger side supports into the braze fixture 10. It can be seen that when the heat exchanger is positioned in the frame, the weight of the heat exchanger on the graphite members causes levers 54, 56 to rotate downward about pin 78. As levers 54, 56 rotate downward, guide bars 64 contact side supports 50, 52 of the heat exchanger 12 (as shown in FIG. 2) and urge the side supports 50, 52 toward one another in a direction generally parallel to the longitudinal axis of the headers 14, 20. The amount of pressure acting against the side supports 50, 52 by the guide bars 64 is directly related to the weight of the heat exchanger since the weight of the heat exchanger causes the downward rotation of the levers 54, 56. As such, the guide bars 64 firmly hold the side supports in place during brazing.

FIGS. 4 and 5 illustrate the details of the pivotable end tank support lever 44. The first position shown in phantom is the position prior to insertion of the heat exchanger into the fixture. The second position of lever 44 shown by the solid line is the position after the heat exchanger has been inserted into the fixture. The lever 44 includes a graphite member 100 press fit into a recess 102. The lever 44 also includes a knockout hole 104. Additionally the lever 44 includes graphite members 106 and 108 press fit into recesses 110 and 112. The lever also includes associated knockout holes 114 and 116. The graphite member 100 includes a chamfered face 101 for guiding the heat exchanger into the frame.

The lever 44 is pivotally mounted on pivot pin 118. The pivot pin 118 is disposed in hanger plates 120 and 122. The hanger plates 120 and 122 are attached to tapping plates 124 (only one of which is shown), which are welded to stringer 30 at points 126 and 128. . The attachment of the hanger plates 120 and 122 is made by socket head cap screws 130, 132, 134 and 136. Lever 44 operates in a manner similar to levers 54, 56. When the heat exchanger is placed on graphite members 106, 108, the weight of the heat exchanger causes lever 44 to rotate downward about pin 118. As lever 44 rotates downward, the flattened portion of graphite member 100 contacts the header 14 of the heat exchanger 12 and urges the the header 14 toward the opposite header 20 in a direction generally perpendicular to the longitudinal axis of the headers 14, 20. The amount of pressure acting against the header 14 by the graphite member 100 is directly related to the weight of the heat exchanger since the weight of the heat exchanger causes the downward rotation of the lever 44. The rotational or pivotal movements of levers 44, 54 and 56 and the corresponding pressures acting against header 14 and side supports 50, 52 by the graphite member 100 and guide bars 64, respectively, due to the weight of the heat exchanger 12 firmly holds the heat exchanger components in place during a brazing operation without the need for banding or wiring the assembly as previously known.

Figure 6:
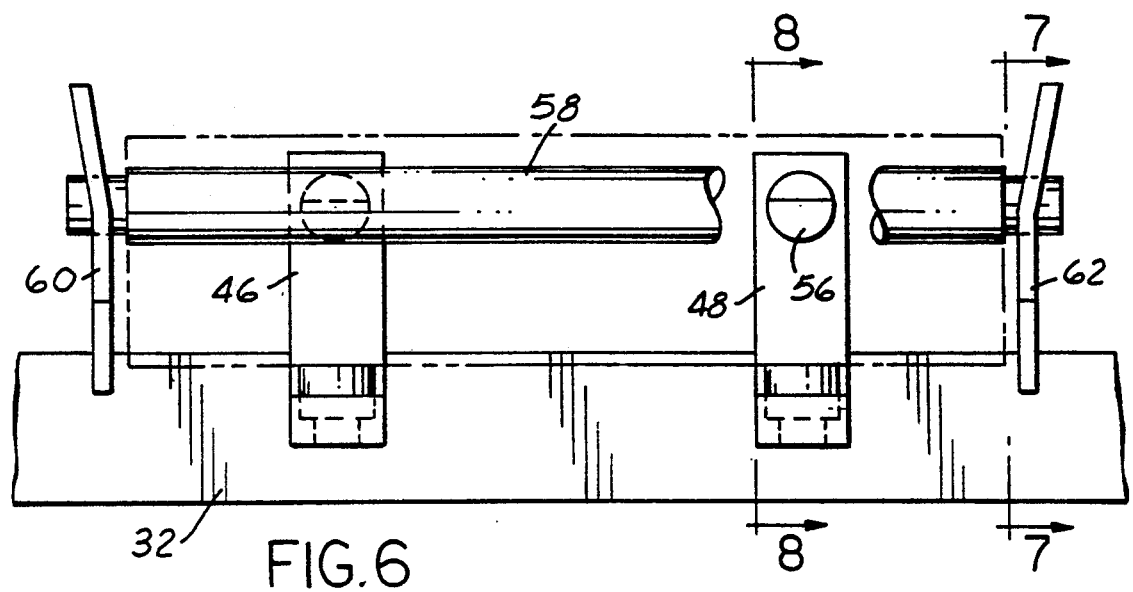
FIG. 6 illustrates a side view of the adjustment means taken along line 6—6 in FIG. 1 according to the present invention.
Figure 7:
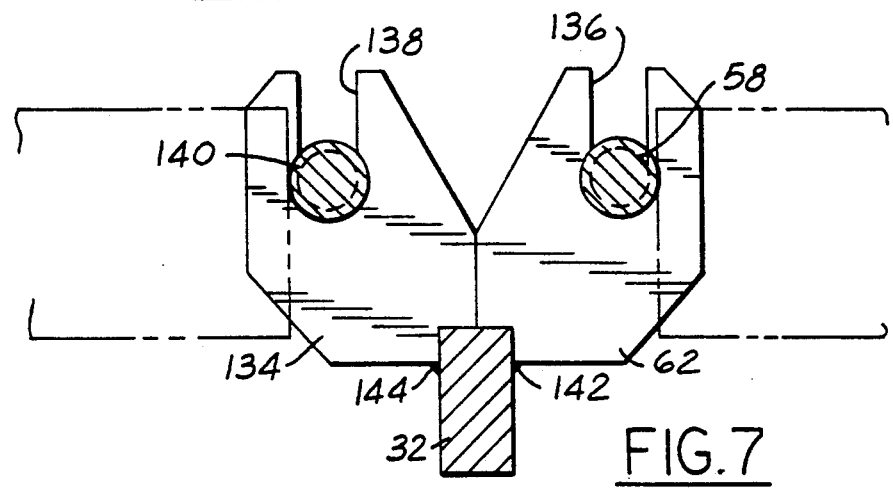
FIG. 7 illustrates a view of the spacer bar receiving members taken along line 7—7 in FIG. 6 according to the present invention.
Figure 8:
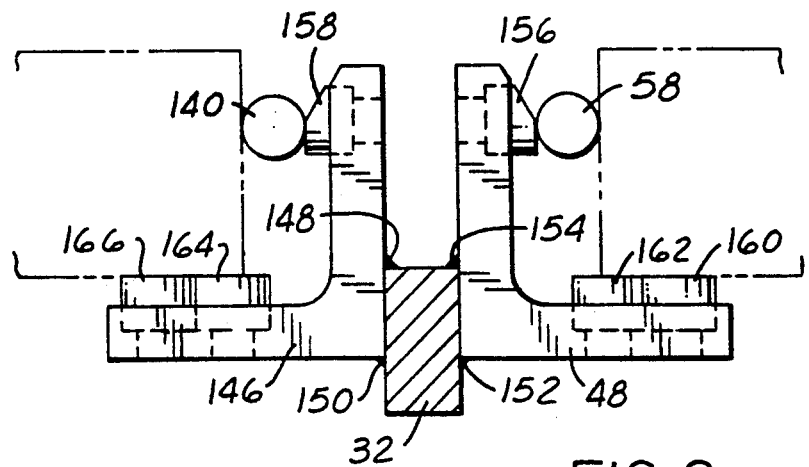
FIG. 8 illustrates a side view of the non-pivoting end tank support levers taken along line 8—8 in FIG. 6 according to the present invention.

FIGS. 6-8 illustrate the details of the adjustment means which can be selectively employed for adjusting the size of the opening for accommodating different size heat exchangers. Attached to stringer 32 is the pair of spacer bar receiving members 60 and 62. If it is desired to have a shorter heat exchanger disposed in the frame, the spacer bar 58 is positionable in grooves in the spacer bar receiving members 60 and 62. FIGS. 6 and 8 show the spacial relationship between the non-pivoting end tank support levers 42, 48 and the spacer bar 58.

FIG. 7 illustrates spacer bar receiving members 62 and 134. The receiving members 62 and 134 include grooves 136 and 138 for receiving spacer bars 58 and 140 therein. The receiving members are attached to stringer 32 by welds 142 and 144.

FIG. 8 discloses the details of the non-pivoting end tank support levers 48 and 146. The levers 48 and 146 are attached to stringer 32 by welds 148, 150, 152 and 154. The levers 48 and 146 also include a chamfered graphite members 156 and 158 as well as non-chamfered graphite members 160, 162, 164 and 166. The chamfered section is formed by grinding a cylindrical piece of graphite on its edge. The spacer bar therefore controls the amount by which the size of the opening will be decreased for accommodating heat exchangers of different size.

It is to be understood that other methods of adjusting the fixture are contemplated by the present invention. For example, the outer frame members and stringers can be adapted to have additional members associated therewith for extending the size of the opening of the frame.

The method of making a heat exchanger using the present invention includes assembling a plurality of tubes and fins together into a subassembly. Then a header plate and a tank are placed on two ends of the subassembly to form a core followed by positioning the core into the fixture wherein the fixture applies a force caused by the weight of the core to firmly hold the core together. The core is then heated to a temperature sufficient to cause the core to braze together and this is followed by a cooling stage prior to removing the brazed cores from the fixture.

While particular embodiments of the present invention have been illustrated and described, it will be obvious to those skilled in the art that various changes and modifications may be made to the methods of our invention and the products produced thereby without departing from the invention. For example, the fixture can be made of other materials and formed by other methods well known to those skilled in the art. The appended claims cover modifications and equivalents which fall within the true spirit and scope of this invention.

What is claimed is:

1. A method for making a heat exchanger comprising the steps of:
   assembling a plurality of tube and fins together into a subassembly;
   placing a header plate and a tank on two ends of the subassembly to form a core;
   positioning the core into a fixture comprising at least two levers mounted to a frame, each of said at least two levers being provided with a graphite member for receiving the core thereon, such that when said core is placed directly on said graphite members, the levers are operative to pivot from a first position to a second position in response to the weight of the core such that in said second position, said levers apply a pressure directly against the tanks thereby firmly holding the core together; and
   heating the core to a temperature sufficient to cause the core to braze together.

2. A method for making a heat exchanger according to claim 1, wherein said method further includes the step of providing said fixture with a third lever pivotably mounted on said frame on a third side of said frame opposite either of said at least two levers such that when said core is placed directly on said levers, the third lever is operative to pivot from a first position to a second position in response to the weight of the core such that in said second position, said third lever directly applies a pressure against the sides of said core orthogonal to said tanks for firmly holding the sides of the core.

3. A method of making an automotive heat exchanger comprising a frame, a pair of headers, a pair of tanks, a plurality of tubes, a plurality of fins, and a pair of side supports, the method comprising the steps of:
   assembling the plurality of tube and fins together into a subassembly;
   placing the headers and tanks on orthogonal ends of the subassembly and interposing each one of the pair of side supports at opposite ends thereof to form a core;
   positioning the core onto at least two pivotable levers mounted to a frame of a brazing fixture, the core being placed on a support surface of each lever, each support surface being provided with a graphite member for receiving the core thereon, such that when said core is placed on said support surface, each lever pivots from a first position to a second position in response to the weight of said core being placed thereon, and in said second position, a guide bar disposed generally perpendicularly to the support surface of each lever applies a pressure against said core to firmly hold the core together; and
   heating the core to a temperature sufficient to cause the core to braze together into a heat exchanger.

* * * * *